United States Patent [19]
Troeder et al.

[11] 4,322,649
[45] Mar. 30, 1982

[54] STATOR FOR AN ELECTROMOTOR

[75] Inventors: Lutz Troeder, Unterpfaffenhofen; Franz Hoyss, Bad Tölz, both of Fed. Rep. of Germany

[73] Assignee: Hilti Aktiengesellschaft, Schaan, Liechtenstein

[21] Appl. No.: 110,632

[22] Filed: Jan. 9, 1980

[30] Foreign Application Priority Data

Jan. 15, 1979 [DE] Fed. Rep. of Germany ....... 2901321

[51] Int. Cl.³ .............................................. H02K 3/00
[52] U.S. Cl. .................................... 310/194; 310/214; 310/43; 310/260
[58] Field of Search ................ 310/194, 219, 260, 270, 310/43, 215, 71

[56] References Cited
U.S. PATENT DOCUMENTS 2,999,176  9/1961  Lindström et al. ............. 310/194 X
3,027,475  3/1962  Gaudry ................................ 310/260
3,495,109  2/1970  Ames ............................. 310/260 X
3,725,707  4/1973  Leimbach et al. .................... 310/71
3,984,714  10/1976  Grözinger et al. ................. 310/194
4,161,669  7/1979  Aimar ............................. 310/260 X

FOREIGN PATENT DOCUMENTS 2161930  6/1973  Fed. Rep. of Germany .

Primary Examiner—Donovan F. Duggan
Attorney, Agent, or Firm—Toren, McGeady & Stanger

[57] ABSTRACT

In a stator for an electromotor, field coils associated with a packet of laminations are spaced apart by filler pieces. The combination of the field coils and filler pieces form an annular arrangement. Each filler piece extends between the adjacent ends of two field coils. The filler pieces are slotted in the radial direction to provide a certain adjustability in the circumferential direction of the annular arrangement where the dimension between the adjacent ends of the field coils is subject to variation.

10 Claims, 3 Drawing Figures

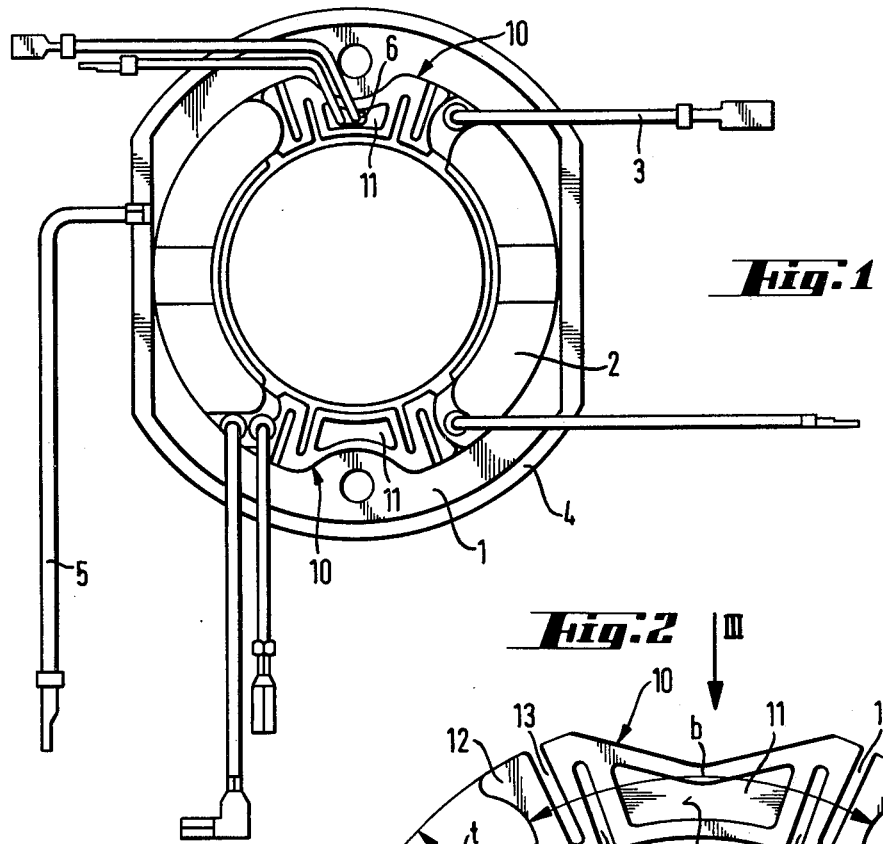
Fig. 1
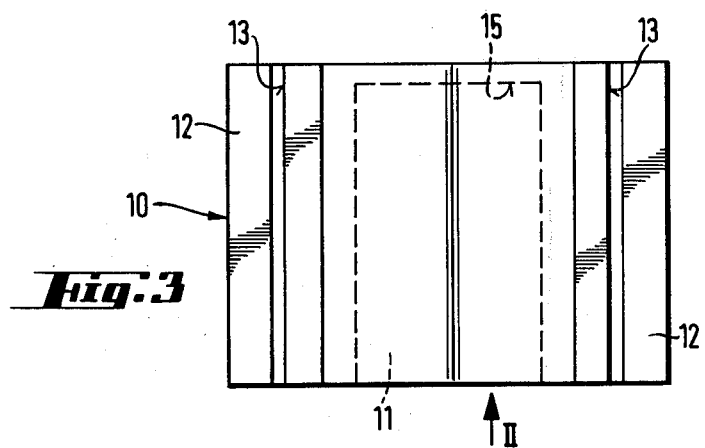
Fig. 2
Fig. 3

STATOR FOR AN ELECTROMOTOR

SUMMARY OF THE INVENTION

The present invention is directed to a stator for an electromotor having a packet of laminations and field coils with a filler piece of substantially ring-segment shape positioned between the field coils to fill the open space therebetween.

In the manufacture of an electromotor, the field coils are wound on the poles of the packet or stack of laminations, or prefabricated field coils are inserted in the packet. To secure the field coils, it is customary to drip impregnating resin into the windings. Open spaces are formed between individual winding legs. To seal these open spaces and force the cooling air current to flow through the air gap between the pole shoes and the end windings, it has been known to place a filler piece of substantially ring-segment shape between the individual windings. Such a filler piece also maintains the field coils in position.

The open spaces between the field coil legs are not always equal in size. Because of manufacturing tolerances on one hand, and the different number of turns for different line voltages on the other, the dimensions of the field coils relative to one another may be slightly different. As a result, several sizes of the filler pieces must be stocked for the same type of motor. If a single size of filler piece is to be used, the dimensional differences must be compensated by additional impregnating resin. If this is done, condiderable additional costs are incurred. Furthermore, the dissipation of heat from the winding to the iron laminations is impaired by the accumulations of impregnating resin.

Therefore, it is the primary object of the present invention to provide a simple, economical and reliable device for securing the field coils and closing off the open space between the adjacent ends or legs of the field coils.

In accordance with the present invention, the problem previously experienced is overcome by providing a filler piece which has a certain dimensional adjustability in the direction extending between the field coils. The adjustability is afforded by making the filler piece resilient.

Because of its resilient characteristic the filler piece can be used for identical motors where there are different circumferential dimensions in the open spaces between the field coils. Accordingly, a greater number of the same pieces can be maintained in stock so that storekeeping is simplified and costs are quite considerably reduced. Due to the resilient character of the filler piece, it can be inserted mechanically into the finish-wound stator using an automatic assembling machine.

To provide the filler pieces with the requisite resiliency, radially extending oblong slots are formed in the filler pieces. If the width of these oblong slots is reduced, then the dimension of the filler piece in the circumferential direction is reduced. If the oblong slots are formed over the height of the filler pieces, that is the dimension extending perpendicularly to the dimension between the adjacent ends of the field coils, the filler pieces can be produced economically by extrusion and then cut to the required height or length.

To assure that the filler pieces are not excessively weakened by the oblong slots, it is advantageous if the slots are located in the opposite ends of the filler pieces which bear against the field coils with the slots alternating on the radially inner and outer sides of the filler pieces. The number of oblong slots can be selected in accordance with the desired adjustable deformability of the filler piece. With such an arrangement of the slots it is possible to ensure that the filler piece is evenly deformed along its radially inner and outer surfaces.

To assure that the resistence to deformation of the filler piece is not too great, while the filler piece can still exert a sufficient initial stress on the field coils, it is advisable if the depth of the slots in the radial direction is in a range of 0.7 to 0.9 times the dimension of the filler piece in the radial direction. It is particularly suitable if the depth of the slots is 0.8 times the radial thickness of the filler piece. For manufacturing reasons, the wall thickness of the filler piece should be maintained as constant as possible. To meet this requirement, it has been found to be advantageous if the filler piece includes a pocket-type recess. Such a recess limits the amount of material utilized and thereby affords considerable savings in material and costs.

A particular feature of electromotors used for mobile apparatus is that they must be compact for reasons of space. Frequently, electronic parts are secured on or in the stator. To accommodate such parts, it is advsiable if the pocket-type recess in the filler piece is designed to receive electronic parts. Such an arrangement is particularly suitable for temperature-monitoring parts. Moreover, the installation of chokes or throttling coils and the like for interference suppression is also possible in the pocket-type recesses. In the continuous operation of an electromotor, considerable heat is generated by electrical and other losses. To ensure the resilient properties of the filler piece at higher temperatures it is advantageous if it is made of a heat-resistant plastics material. Plastics material has the further advantage that it is electrically insulating.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described preferred embodiments of the invention.

BRIEF DESCRIPTION OF THE DRAWING

In the Drawing:

FIG. 1 is a plan view of a stator embodying the present invention;

FIG. 2 is an enlarged view of a filler piece shown in FIG. 1 with the view being taken in the direction of the arrow II in FIG. 3; and FIG. 3 is elevational view of the filler piece shown in FIG. 2 taken in the direction of the arrow III in FIG. 2.

DETAIL DESCRIPTION OF THE INVENTION

In FIG. 1 a stator is illustrated including a packet or stack of laminations 1 with field coils 2 wound on or inserted into the laminations. Connecting wires 3 are secured to the outside of the stator. The entire stator is enclosed laterally by an insulating housing 4. Housing 4 prevents any electrical connection with the motor casing in the event of a defect. On the exterior of the stator, a B-conductor 5 is connected for interference suppression. The field coils extend in the circumferential direction around the stator and an open space is provided between the adjacent ends of the field coils. Each open space is closed by a filler piece 10 having a ring-segment shape with the combination of the field coils and the filler pieces forming an annular arrangement. The filler pieces 10 serve a dual function, that is, filling the open space between the field coils and maintaining the field coils in position. The filler pieces 10 are resilient in the arcuate or circumferential direction and, thus, can accommodate any differences in the dimensions between the adjacent ends of the field coils 2. Each filler piece has a pocket-type recess 11 for receiving electronic parts, such as a temperature safety device 6.

In FIG. 2 a filler piece 10 is shown on an enlarged scale. Adjacent each of the ends 12 which bear against the adjacent ends of the field coils 2, oblong slots 13 extend in the radial direction of the filler piece. Each end 12 has two slots 13 one extending inwardly from the radially outer surface and the other extending radially outwardly from the inner surface. The depth t of the oblong slots is about 0.8 times the thickness a of the filler piece. Due to this slotted configuration of the filler piece it is resilient in the arcuate or circumferential direction b. Each end 12 has a rounded recess 14 into which the adjacent end of the field coil seats. When filler piece 10 is inserted into the stator, the adjacent ends of the two field coils bear or seat within the rounded recesses 14 with the field coils being held in place by the filler piece. As can be seen best in FIG. 3, the pocket-type recess 11 extends for almost the full height of the filler piece so that the filler piece has a uniform wall thickness.

In FIG. 3 the filler piece is viewed from the outside of the stator, that is in the direction of the arrow III. In FIG. 3 it can be seen that the pocket-type recess 11 does not extend for the full height of the filler piece, rather the recess is closed at the upper end by a closure wall 15. This closure wall prevents the major part of the cooling air from flowing in an ineffective manner through the filler piece 10. The location of the closure wall 15 can be selected at random within the filler piece.

While specific embodiments of the invention have been shown and described in detail to illustrate the application of the inventive principles, it will be understood that the invention may be embodied otherwise without departing from such principles.

What is claimed is:

1. Stator for an electromotor including a packet of laminations, field coils associated with said laminations, adjacent ends of said field coils being spaced apart and forming an open space therebetween, a ring-segment shaped filler piece located in the open space and extending between the adjacent ends of said field coils for filling the open space and retaining said field coils in position, wherein the improvement comprises that said filler piece is resilient in the direction between the adjacent ends of said field coils so that said filler piece can adapt to variations in the dimension between the adjacent ends.

2. Stator, as set forth in claim 1, wherein the combination of said field coils and filler pieces being annular, said filler pieces having a radially inner surface and a radially surface with at least one radially extending slot formed in said filler piece extending from one of said inner and outer surfaces thereof toward the other one of said inner and outer surfaces.

3. Stator, as set forth in claim 2, wherein one of said slots is located adjacent each end of said filler piece.

4. Stator, as set forth in claim 3, wherein at least a pair of said slots are located adjacent each end of said filler piece with one of said slots of said pair extending radially outwardly from the radially inner surface of said filler piece and the other said slot of said pair extending radially inwardly from the radially outer surface of said filler piece.

5. Stator, as set forth in claims 2, 3 or 4, wherein said slots having a depth dimension in the radial direction of said filler piece in the range of 0.7 to 0.9 times the thickness of the filler piece in the radial direction.

6. Stator, as set forth in claims 1, 2, 3 or 4 wherein said filler piece forms a pocket-type recess closed laterally and having a closure wall extending across said recess so that a flow of air cannot pass through said recess from one end thereof to the other.

7. Stator, as set forth in claim 6, including an electronic part positioned within said pocket-type recess.

8. Stator, as set forth in claim 6, wherein said filler piece is formed of a heat-resistant plastics material.

9. Stator, as set forth in claim 2, wherein the ends of said filler piece extending in the radial direction each have a rounded recess therein for forming a seat for one of said field coils.

10. Stator, as set forth in claim 5, wherein each of said oblong slots has a dimension in the radial direction of 0.8 times the thickness of said filler piece in the radial direction.

* * * * *